US009432501B2

(12) United States Patent
Vishwanath (10) Patent No.: US 9,432,501 B2
(45) Date of Patent: Aug. 30, 2016

(54) INTELLIGENT RINGTONE AND ALARM MANAGEMENT FOR SMARTPHONES

(71) Applicant: Vidush Vishwanath, Santa Clara, CA (US)

(72) Inventor: Vidush Vishwanath, Santa Clara, CA (US)

(*) Notice: Subject to any disclaimer, the term of this patent is extended or adjusted under 35 U.S.C. 154(b) by 0 days.

(21) Appl. No.: 14/027,236

(22) Filed: Sep. 15, 2013

(65) Prior Publication Data

US 2015/0079949 A1   Mar. 19, 2015

(51) Int. Cl.
| | |
|---|---|
| *H04M 3/02* | (2006.01) |
| *H04W 4/16* | (2009.01) |
| *H04M 3/42* | (2006.01) |
| *H04M 19/04* | (2006.01) |

(52) U.S. Cl.
CPC ........... *H04M 3/02* (2013.01); *H04M 3/42051* (2013.01); *H04M 19/04* (2013.01); *H04W 4/16* (2013.01)

(58) Field of Classification Search
None
See application file for complete search history.

(56) References Cited

U.S. PATENT DOCUMENTS

| | | | |
|---|---|---|---|
| 8,145,278 B2* | 3/2012 | Sweeney et al. | 455/567 |
| 2005/0180554 A1* | 8/2005 | Alston et al. | 379/207.16 |
| 2008/0159522 A1* | 7/2008 | Ericson | 379/373.02 |
| 2010/0227602 A1* | 9/2010 | Zhang | 455/418 |

* cited by examiner

*Primary Examiner* — Kenny Lin (57) ABSTRACT

A method and system of managing ringtones and alarms by intercepting device events, associating them with user events, smartphone sensor data and text search to intelligently alter the smartphone ringtones without user intervention. Conventionally, altering the ringtone of a smartphone is done through manual selection and is at most customizable with static selections like a different ringtone for text messages and a different for phone call. The present invention provides a control program along with associated data structures that implement intelligent and context sensitive ringtone selection decisions based on a combination of user data from their incoming text, email, alerts, phone calls and combining them with sensor data from the functions of sensory apparatus on smartphones, user generated functions and a rules set for establishing ringtone rules.

1 Claim, 6 Drawing Sheets

BLOCK DIAGRAM OF INTELLIGENT RINGTONE AND ALARM MANAGEMENT SYSTEM

FIGURE 1
SMARTPHONE, SMARTWATCH AND COMPUTER SYSTEM

FIGURE 2
BLOCK DIAGRAM OF A SMARTPHONE

FIGURE 3
BLOCK DIAGRAM OF INTELLIGENT RINGTONE AND ALARM MANAGEMENT SYSTEM

FIGURE 4
CONTROL PROGRAM: COMMON LOGIC MODULE

FIGURE 5
CONTROL PROGRAM: INTERACTIVE MODE LOGIC MODULE

FIGURE 6
CONTROL PROGRAM: BACKGROUND MODE LOGIC MODULE

INTELLIGENT RINGTONE AND ALARM MANAGEMENT FOR SMARTPHONES

TECHNICAL FIELD

The present invention relates generally to the field of computing devices, and more particularly to managing and controlling the ringtones and alarms in smart devices like smartphones and smart watches that are capable of using scheduling and calendaring data.

BACKGROUND OF INVENTION

In recent years, the smartphone has become the most used communication devices. With its ability to store and manage data, it has also enabled people to use it as a personal time management device. A recently published article in the Business Insider magazine points out that there will be 1.5 billion people with smartphone by December 2013. Smartphones have the capability to send and receive data to and from the Internet, in addition to the ability to process the data. Today, several Americans manage their daily schedules through cloud computing (Ex. Google Calendar and Microsoft Outlook). Such interfaces are accessible through desktop computers at the workplace and through smartphones on the go. If one wishes to have coffee with a friend, he/she may create an event or a meeting on such a calendar. When the time comes, the individual will be alerted about this event on their smartphone. Such automation through the use of cloud computing has added convenience to peoples' schedules in recent years. However, such automation does not exist for automatically silencing a smartphone if you are in a quiet place like a church or changing the ringtones based on the context of the location, event or content on the smartphone. The lack of an intelligent system to selectively silence smartphones can be especially troublesome when a person is in a meeting or conducting an important event.

There are many instances of important appointments, engagements and events, where a person carrying a communication device like a smartphone, is interrupted with phone calls that can wait. There are also several instances where one puts the smartphone on silent or vibrate and forgets to reset it to ring and misses an important call from their boss at work.

Additionally, risks of distraction associated with cellphone usage have prompted lawmakers to pass laws prohibiting use of cellphones during driving. There is no intelligent mechanism to silence a smartphone if one is cruising at a certain speed on the freeway and it may be best that a smartphone does not ring unless it is an emergency.

The invention presented here implements an intelligent method of managing ringtones and alarms based on the users' schedule of events throughout the day, the geo-location factors of the smartphone, and the content being received on the smartphones.

SUMMARY OF INVENTION

Technical Problem

Everyday, people heading to school or official meetings silence their smartphones by using the "off" button, selecting a "silent" setting or setting the volume to minimum. Later, after the event, they are required to un-silence their phones. Though a physical button or the user interface of the smartphone provide an option to change the behavior of the ringtones, it remains a manual user process that a person may exercise multiple times a day. At best this is a cumbersome process and prone to human errors. Frequently the user forgets to set the ringtone back to normal which results in missing an important call or event.

The problem is exacerbated due to hundreds of different models of smartphones with different user interfaces which offer different methods of changing ringtones and silencing the smartphones. Most people struggle with making the changes manually, multiple times a day and ultimately give up on managing their ringtones and how and when their smartphones should ring.

To add to the confusion, there are thousands of ringtones available for download and installation on a smartphone, both free and paid products. Though there are ample choices in number and quality of ringtones accessible to users, there is no easy mechanism to play these differently for different events and conditions a person may want to use a distinctive ringtone for. Currently one can associate a certain ringtone for a certain function, like phone calls, text messages and alarms, each of these settings needs manual changes.

Solution to the Problem

The system and method described herein as "Intelligent Ringtone and Alarm Management", eliminates the repetitive, manual process for managing ringtones and alarms. Smartphones have the ability to store data, process data and run applications that can do specialized or general purpose computing tasks. Information such as when an individual's phone should be silenced or un-silenced, or what ringtone should be used under what circumstances can be used to intelligently use certain ringtones in certain situations and even completely silence the smartphones under certain conditions.

Intelligent Ringtone and Alarm Management is composed of five distinct parts: the "Events Dictionary", the "Events Set", the "Control Program", the "Ringtone Mapping" and the "Ringtones Rules". Each of the five parts has a very distinct purpose in intelligently arriving at a conclusion on what ringtone to use under what circumstances. The Intelligent Ringtone and Alarm Management is implemented as software and it listens to specific events that happen on the device, in our case, the smartphone. Its primary jobs are to Intercept certain "Device Events" and take action, if needed. "Device Events" are system generated events like NewEmail( ), that triggers when a new email arrives on the device, NewAlert( ) when an alert is about to go off, or NewTextMessage( ), when a new text or SMS message is received on the device, in our case the smartphone.

The "Events Dictionary" is implemented as a data structure that contains items as {key, value} pairs. The item holds functions and their desired values. Functions need to be evaluated for taking an intelligent action on ringtones.

The "Events Set" is a dynamic collection of items from the "Events Dictionary" that have computed to be true in that instance of time. Since the items in the "Event Set" are taken from the "Events Dictionary", these are also {key,value} pairs.

The most important part of the system is the "Control Program" that continuously runs in the device, in our case, the smartphone. The "Control Program" is a collection of instructions and data, further implemented into specific modules that process the "Events Dictionary" and collect the items that are true at any instance of time into the "Events Set". The "Control Program" also implements the User Interface for managing configuration of certain elements of the system and managing ringtones. In addition the "Control Program" also stores three separate ringtones that are used in certain situations, the ringtones being "silent", "vibrate", and "flash" respectively. The "Control System" described above can be written in Objective C for the iPhone or as a Java application for Android bases smartphones using the respective APIs (application programming interfaces) to achieve the functionality described herein.

The "Ringtone Mappings" is also implemented as a data structure that contains items as {key,value} pairs. The item holds text strings and ringtones. The purpose of "Ringtone Mappings" is to serve as a repository that Is used by the "Control Program", to decide which ringtone it should select for playing when a particular text is found in events generated on the device ("Device Events").

The final piece of the system is the "Ringtone Rules", implemented in a mobile relational data database structure like the open source SQLite or commercial products like Oracle Database Lite, SQLAnywhere and many other similar products in the marketplace. The "Ringtone Rules" consist of one or more {key,value} pairs from "Events Directory" and one and only one {key,value} pair from "Ringtone Mapping". The "Ringtone Rules" can be in active or inactive state.

The "Control Program" manages the "Ringtone Mappings", "Events Dictionary", "Events Set" and the "Ringtone Rules. The "Device Events" generated on the device, in our case, the smartphone, are available as an API that the "Control Program" can listen to. Once an event is triggered, the "Control Program" used the "Events Directory" to dynamically generate the "Events Set" that is matched against the "Ringtone Rules". If an appropriate "Events Set" match is found by the "Control Program", it then matches the "Device Event's" content against the respective text from the {key,value} pair representing the ringtone mapping in the matched ringtone rule. If there is a match, and the ringtone rule is active, the smartphone is set to use the matched ringtone.

Advantages of the Invention

This invention solves the problem of having to manually alter ringtone based on certain events or time of the day. In addition, it manages the ringtones and alarms intelligently not only based on events generated by the device, but also based on the events happening dynamically. In addition, the content of the events is taken into consideration before altering the ringtone setting of the device.

Additionally, the present invention relieves a person from worrying about, or executing special settings on their smartphones when they want to be alerted or when they do not want to be disturbed. These decisions are handled intelligently by the "Intelligent Ringtone and Alarm Management" system based on contents of user's email, calendar entries, text messages, where the smartphone is, based on data from the GPS, the accelerometer or any other component on the smartphone.

The present invention has further advantages. The features of this invention can be extended to apply to other conditions apart from processing calendar entries. For example, the invention can be applied to automatically silence a phone when the owner is driving, based on the speed data from the built-in GPS systems on smartphones. Such a product will lead to added convenience and may lead to a reduction in the number of driving accidents. Furthermore, this feature could be extended to provide a larger range of usability. The user can interact with the dictionary and add unique keywords that match with a sender's identification. For example a phrase or keyword matching a sender's email address or name would lead to a silenced phone while a phrase or keyword matching another user can alert a user with a special ringtone.

DESCRIPTION OF EMBODIMENTS

The present invention is described in the context of a specific embodiment. This is done to facilitate the understanding of the features and principles of the present invention and the present invention is not limited to this embodiment. In particular, the present invention is described in the context of managing ringtones intelligently on a smartphone.

Figure 1:
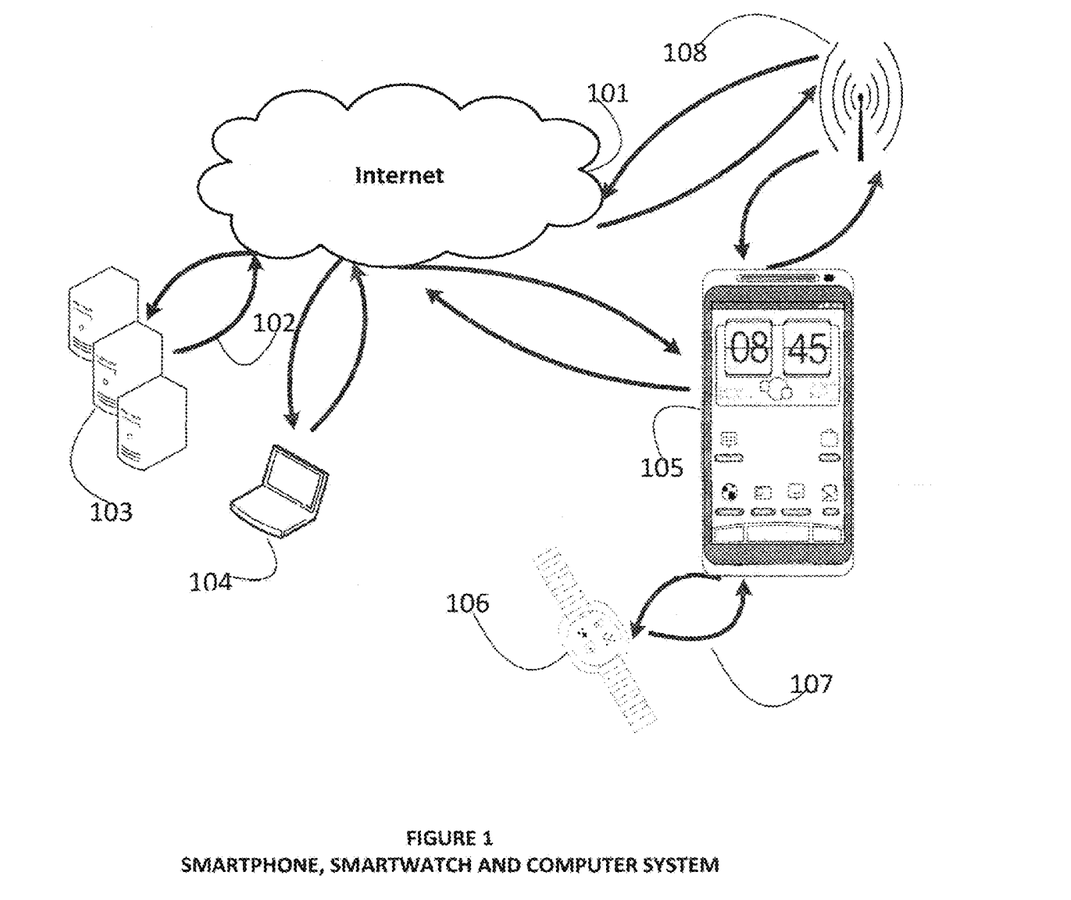
FIG. 1 is a general overview of how smartphones, smartwatches and computers are connected with each other and with the Internet to exchange data and carrier networks to make phone calls.

FIG. 1 shows a typical environment where the present invention would be used. A smartphone 105 is connected to the Internet 101, the carrier network 108 over 3G/4G/LTE connection. A laptop 104 and servers 103 are connected through network links 102 to the Internet 101. A smartwatch 106 is connected to the smartphone 105 using Bluetooth 107 or any other network protocol.

Figure 2:
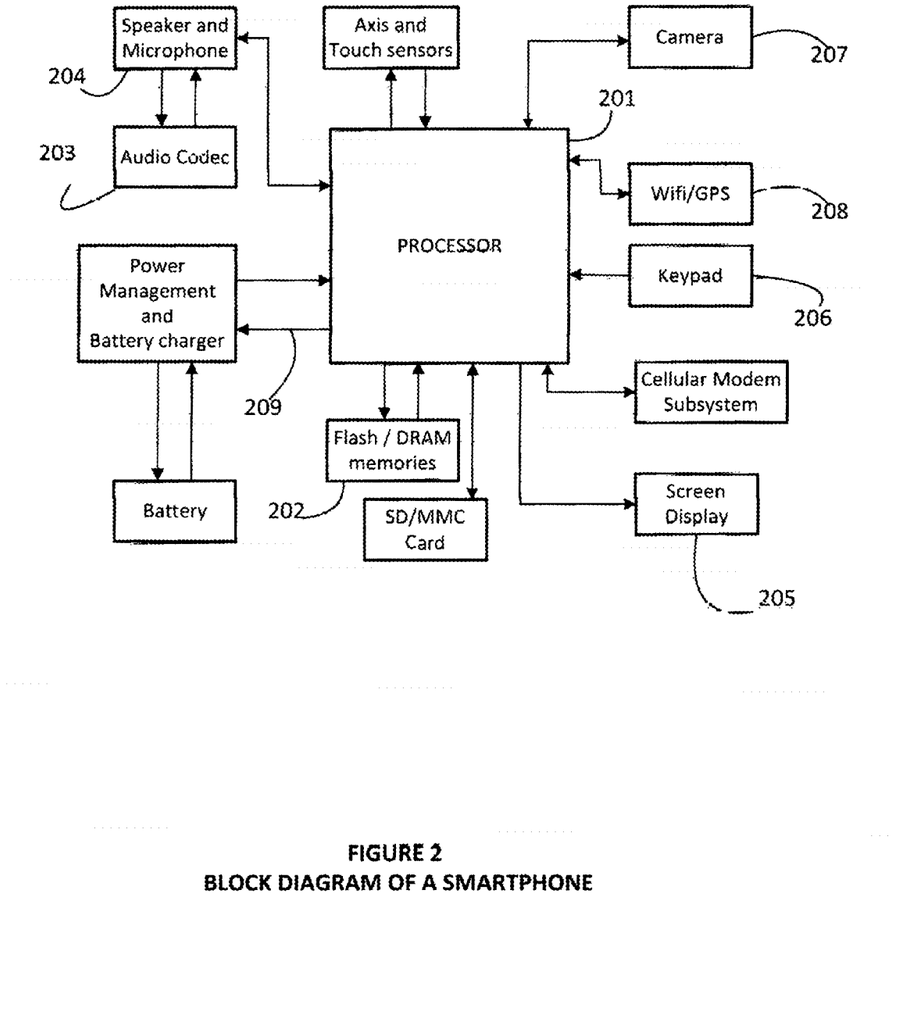
FIG. 2 is a block diagram of the smartphone with various components.

FIG. 2 is a generalized block diagram of a smartphone 105 including a central processing unit (PROCESSOR) 201, main memory (typically DRAM) 202, Audio codecs 203 that can store ringtones, speaker and microphone 204, a display screen 205 that is used for entering data and, in case it Is a touchscreen, it is also used for interacting with the smartphone. A keyboard 206, and other components like the camera 207, the GPS 208 and several others. Most components are connected with the processor through a system bus 210. The processor runs the smartphone operating system that provides the ability to write and run programs like the present invention.

Figure 3:
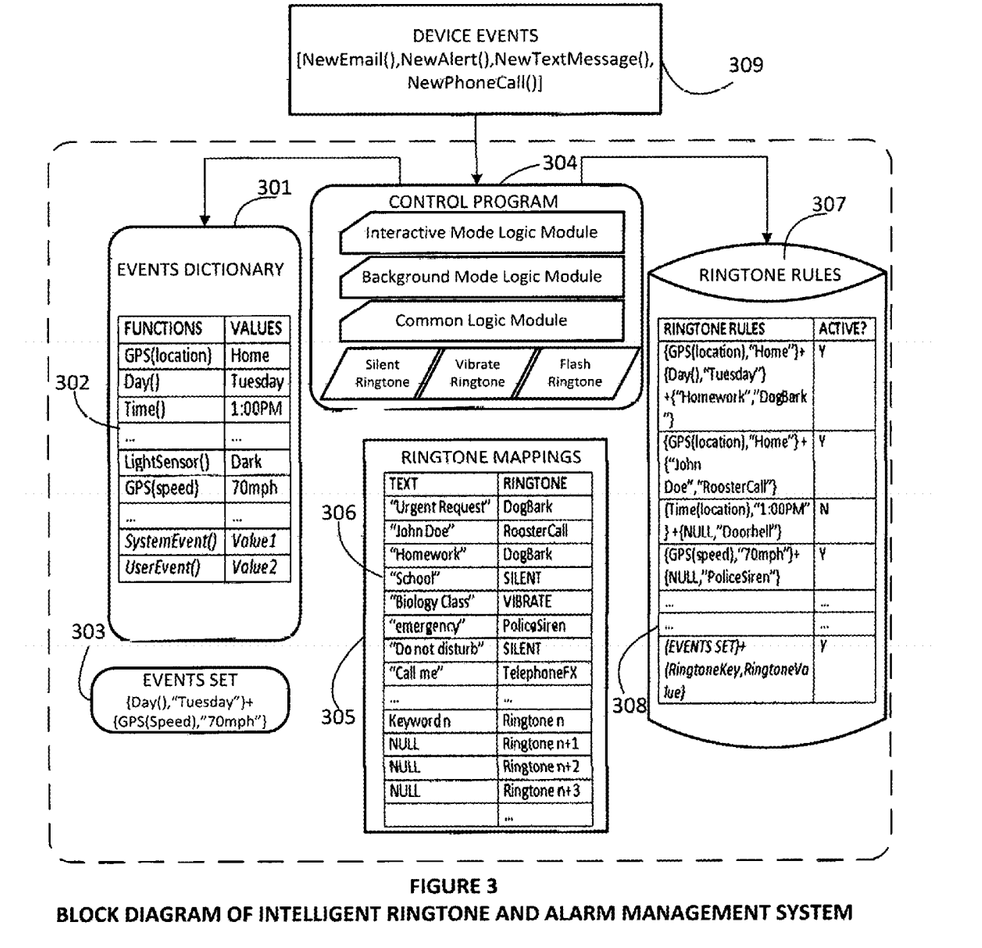
FIG. 3 is a block diagram of the various components that comprise of the present invention.

FIG. 3 describes the five different components of the present invention in its current embodiment. The preferable method of storing data in the current embodiment of this invention is {key, value} pairs, represented as {key, value} for ease of understanding and illustration. "Device Events" are system or user generated events that live outside of the present embodiment of this invention. Each time a new email message arrives or a new text message is received, an event is fired off in the smartphone operating system. This event is available through APIs and can be hooked into by other software programs that can process data and change the smartphone behavior. One such behavior is changing the ringtone and alarms settings. While the current invention is described specifically with examples of the smartphone, and alternate embodiment can replace the smartphone with a PC (Personal Computer), or any other device that can process instructions and store data.

The first component is a data structure called the "Events Dictionary" 301 that holds functions and their values that need to be evaluated for taking an intelligent action on ringtones. This information is stored as a {key,value} pair 302, where key=any function that can be evaluated. Typically any object exposed through the API will have a function that can return a value. If the value of the computed functions equals the value stored in the {key, value} pair 302, the item is tagged as "TRUE", otherwise its tagged as "FALSE" The following examples describe a few function and how they are used and stored:

Example 1

An example of such a function can be the time function e.g. time( ) that return the current time on the smartphone.

Example 2

Another example can be a function on the GPS object, e.g. GPS(location) that returns the coordinates the current location or the nickname of the previously saved coordinates like home, school, pharmacy, etc.

Example 3

A {key,value} pair from example 2 above can be stored as {GPS(location),"School"} provided "School" is a tag that maps the actual coordinates of the user's school.

The "Events Set" 303 is a dynamic collection of items from the "Events Dictionary" that have computed to be TRUE in that instance of time. Since the events in the "Event Set" are taken from the "Events Dictionary", these are also {key, value} pairs 302. The functioning of the "Events Set" 303 is illustrated in the example 3 below:

Example 3

When the "Control Program" 304 reads "Events Directory"301 and finds {GPS(location), "Home") as a {key, value} pair 302, It will evaluate GPS(location). The function GPS(location) will return the coordinates of the present location. If the coordinates returned are tagged as "Home", the GPS(location) function computed to the stored value in "Events Dictionary" 301 and the {key, value} pair i.e. {GPS(location), "Home"} will be placed in the "Events Set" 303.

The "Control Program" 304 continuously runs on the device. The "Control Program" 304 is a collection of instructions and data, further implemented into specific modules that process the "Events Dictionary" 301 and create the "Events Set" 303. The "Control Program" 304 also implements the User Interface for managing configuration of certain elements of the system and managing ringtones. In addition the "Control Program" 304 also stores three separate ringtones that are used in certain situations, the ringtones being "silent", "vibrate", and "flash" respectively. The "Control System" 304 has three modules implemented in software. These are "Interactive Mode Module" that implements the GUI that controls data entry to all other components of the present invention. The "Background Logic Module" continuously scans the "Events Dictionary" 301 and evaluates each function in the {key, value} pair 302 for each item. As soon as it find a function that equals the value in the {key,value} pair 302, it has computed the item to be TRUE and it adds the {key,value} pair 302 to "Events Set" 303. If the item computes to FALSE, then the item, if present in the "Events Set" 103 is removed by the "Background Logic Module".

The "Ringtone Mappings" 305 is also implemented as a data structure that contains items as {key,value} pairs 306. The item holds text strings and ringtones. The purpose of "Ringtone Mappings" 305 is to serve as a repository of information for the "Background Mode Logic Module" of the "Control Program" 304, which decides what ringtone it should select for playing when a particular text, from the {key,value} pair 306 is found in events generated on the device ("Device Events"). Items from "Ringtone Mappings" 305 are used in "Ringtone Rules" 307.

The final piece of the system is the "Ringtone Rules" 307, implemented in a mobile relational data database structure like the open source SQLite or commercial products like Oracle Database Lite, SQLAnywhere and many other similar products in the marketplace. The "Ringtone Rules" 307 consist of one or more {key,value} pairs 302 from "Events Directory" 301 and one and only one {key,value} pair 306 from "Ringtone Mappings" 305. The resulting items 308 in "Ringtone Rules" 307 are also constrained as an index key. This means only one unique, unordered combination of {key,value} pairs makes it to the "Ringtone Rules" 307 database. In addition the items in the "Ringtone Rules" 307 database can be active or inactive as shown in FIG. 3. Note that the {key,value} pair from the "Ringtone Mappings" 305 is of type {"text", "text"}, while the {key,value} pair from the "Events Directory" 301 is of type {function( ), "text"}. The "Ringtone Rules" 307 database can contain multiple but distinct {function( ), "text"} pairs but one and only one {"text", "text"}. The items that can be valid or invalid for the "Ringtone Rules" 307 database are illustrated in examples 4 and 5 below:

Example 3

{GPS(location),"Home"}+{Day( ),"Tuesday"} + {"Homework","DogBark"} and {GPS(location),"Home"}+ {"Homework","DogBark"}+{Day( ),"Tuesday"} cannot be in "Ringtone Rules" 307 at the same time; Only one of these is allowed and the ordering of the {key, value} pairs is not relevant.

Example 5

(GPS(location),"Home")+{Day( ),"Tuesday"}+{"Homework","DogBark"} and {GPS(location),"Home"}+ {"Homework","DogBark} are valid and unique keys so they are allowed in "Ringtone Rules" 307 at the same time.

Figure 4:
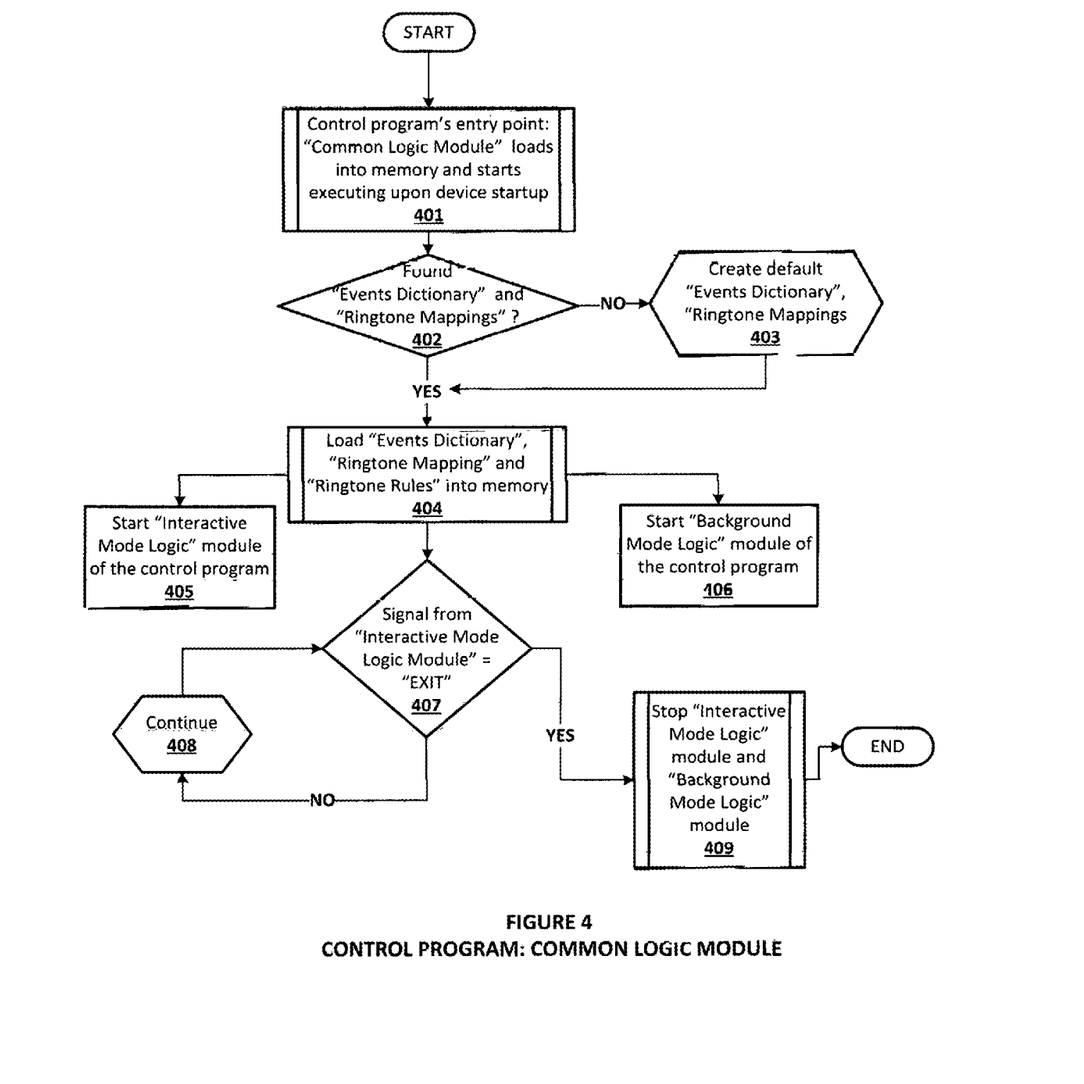
FIG. 4 is a flowchart illustrating the high level functioning of the "Control Program", in accordance with the present invention.

FIG. 4 is a flowchart illustrating the high level functioning of the "Control Program" 304, in accordance with the present invention. The "Control Program" 304 starts upon device startup and its first entry point is the "Common Logic Module" 401. The first step is to evaluate of "Events Dictionary" 301 and "Ringtone Mappings" 305 are available the "Common Logic Module" 402. If these are not present or are not accessible due to any reason, or for the reason of execution for the first time, they are created 403.

Once the "Events Dictionary" 301 and "Ringtone Mappings" 305" are loaded 404, the "Control Program" 304 spawns off "Interactive Mode Logic Module" 405 and "Background Mode Logic Module" 406. It then waits for "Interactive Mode Logic Module" 405 to send it a termination signal 407, otherwise it runs indefinitely 408. Once the "Control Program" 304 receives and EXIT signal from for "Interactive Mode Logic Module" 405, it stops both "Background Mode Logic Module" 406 and "Interactive Mode Logic Module" 405 as shown in step 409 and exits.

Figure 5:
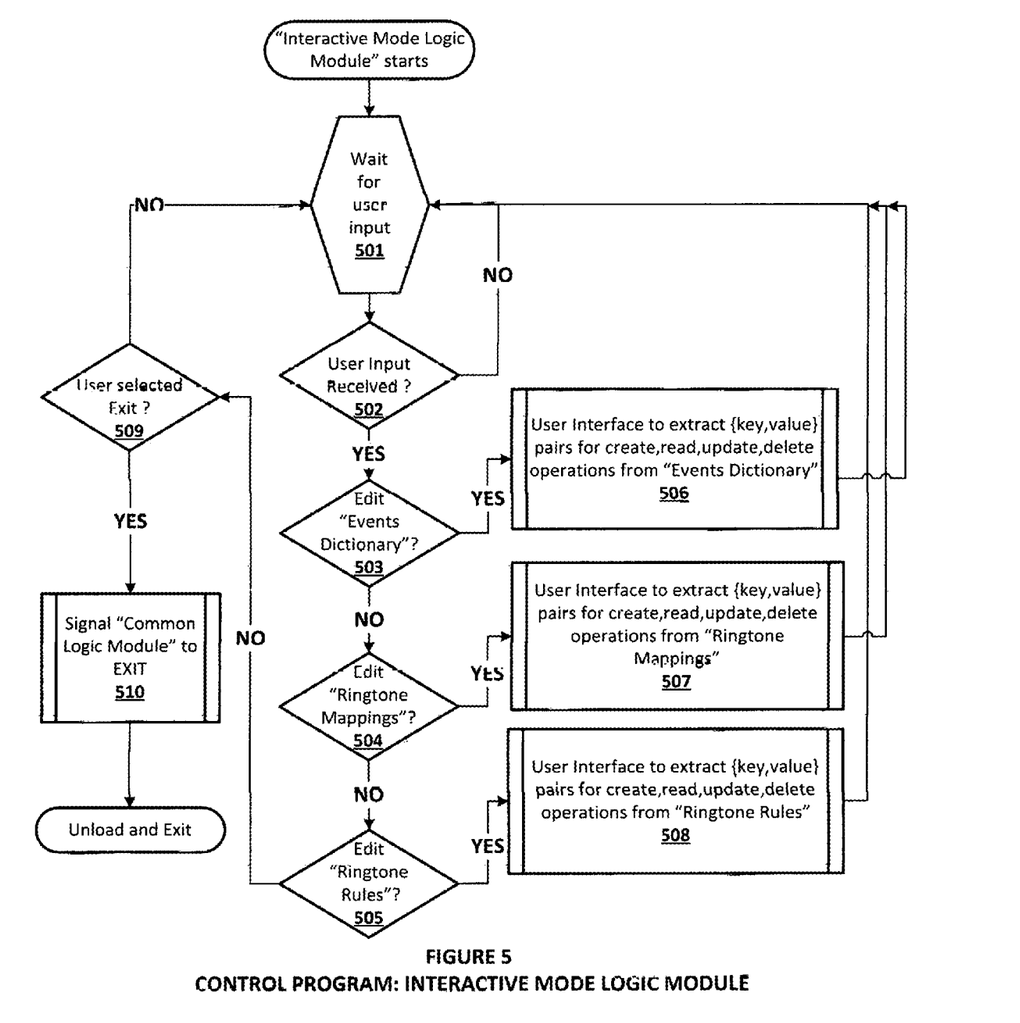
FIG. 5 is a flowchart illustrating the high level functioning of the "Interactive Mode Logic Module", a component of the "Control Program", in accordance with the present Invention.

FIG. 5 is a flowchart illustrating the high level functioning of the "Interactive Mode Logic Module", the graphical user interface component of the "Control Program", in accordance with the present invention. This can be implemented in programming language like Objective-C on the Apple's iOS platform or in Java for Android smartphones. While the presently preferred embodiment uses the smartphone as the device, alternate embodiments can use the PC (Personal Computer), and any compute device that processes instructions and stores data, and has an architecture similar to FIG. 1. The "Interactive Mode Logic Module" waits for user input 501 through means, like a mobile keyboard or touchscreen. If the user the "Events Dictionary" 301, it opens a CRUD (create, read, update, delete) form for managing and manipulating the data in "Events Dictionary" 301. Similarly it carries out user interface management for "Ringtone Mappings" 305 and "Ringtone Rules" 307 in steps 507 and 508 respectively. Once the CRUD form is closed or saved, it goes back to user wait 501 and runs Indefinitely till the user selects exit 509. In such a case, the "Interactive Mode Logic Module" sends the EXIT signal to the "Control Program" 304.

Figure 6:
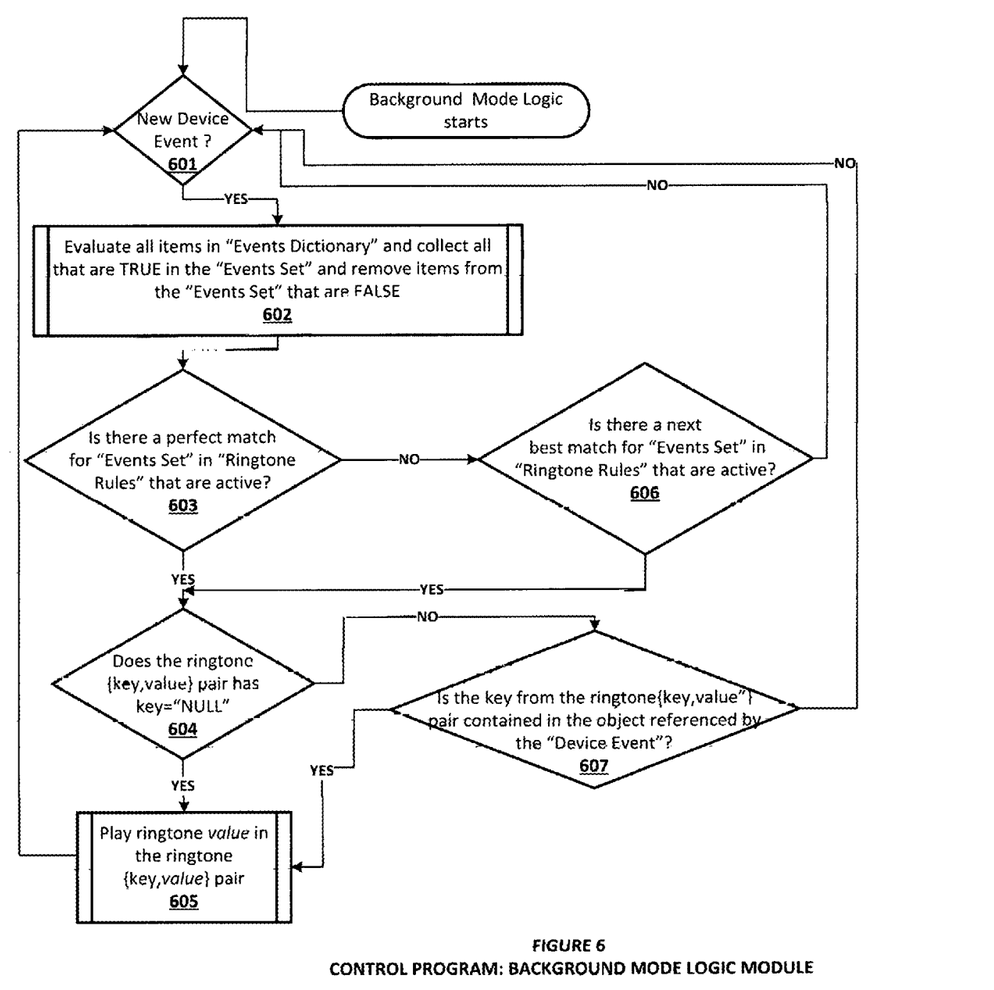
FIG. 6 is a flowchart illustrating the high level functioning of the "Background Mode Logic Module", a component of the "Control Program", in accordance with the present invention.

FIG. 6 is a flowchart illustrating the high level functioning of the "Background Mode Logic Module", a component of the "Control Program" 304, in accordance with the present invention. This can be Implemented in programming language like Objective-C on the Apple's iOS platform or in Java for Android smartphones. While the presently preferred embodiment uses the smartphone as the device, alternate embodiments can use the PC (Personal Computer), and any compute device that processes instructions and stores data, and has an architecture similar to FIG. 1. The "Background Mode Logic Module" intercepts certain device events 601. These events are triggered by the smartphone operating system and available through APIs (Application Programming Interface). For ease of understanding, these events will be represented through generic listener function names like NewEmail( ), NewTextMessage( ), NewPhoneCall( ) and NewAlert( ). Depending on the smartphone device and the operating system, these and similar functions are available in the APIs that can be used by the present invention. An alternate embodiment of the present invention can use similar functions on other devices like the PC (personal Computer) which are capable of processing and storing data. The NewEmail( ) listener function returns data about the new email is received in the inbox of the mail program on the smartphone. Similarly the NewTextMessage( ) returns the incoming SMS or text message, NewPhoneCall( ) returns the information on the incoming phone call through the cellular network over 3G/4G/LTE or through the Internet over VoIP (Voice over IP) and NewAlert( ) returns information on upcoming events in the user's calendar program that stores meetings and appointments and also returns information on the upcoming clock alarm like a wake-up call.

As the "Background Mode Logic Module" intercepts these events and information about these events 602, it starts evaluating the {key, value} pairs 302 in the "Events Dictionary" 301. It extracts the function name, from the first item 302 and evaluates the function. If the result of this evaluation is the same as the corresponding value in the {key, value) pair, then the "Background Mode Logic Module" considers this condition as TRUE and adds the {key, value} pair to the "Events Set" 303, if it is not already present. If however, the function is evaluated and the result does not match the corresponding value in {key, value} pair, then the "Background Mode Logic Module" considers this condition as FALSE and deletes the {key, value} pair from the "Events Set" 303, if it is present in the "Events Set" 303.

This way the "Events Set" 303 contains only the unique {key, value} pairs that are evaluated TRUE, by the "Background Mode Logic Module" of the "Control Program" 304 upon each monitored device event. The following examples 6 and 7 illustrate how the "Events Set" 303 is dynamically managed by the "Control Program" 304 upon intercepting the device events and using the "Events Dictionary" 301.

Example 6a

Assume Events Set={Year( ), "2013"} and a new email is received and the "Background Mode Logic Module" receives data from NewMail( ). Under step 602, only one of the items in the "Events Dictionary" 301 is found TRUE. Let's say {Day( ),"Tuesday"} is TRUE. Then Events Set is set to {Day( ),"Tuesday"}+{Year( ), "2013"}.

Example 6b

Assume Events Set={Day( ),"Tuesday"}+{Year( ), "2013"} and a new email is received and the "Background Mode Logic Module" receives data from NewMail( ). Under step 602, none of the items in the "Events Dictionary" 301 is found TRUE. Let's say {Day( ),"Tuesday"} is FALSE. Then Events Set is set to {Year( ), "2013"}.

After processing all items in the "Events Dictionary" 301 and completing updates to the "Events Set" 303, the "Background Mode Logic Module" looks for a perfect match for {key, value} pairs in step 603 between the "Events Set" 303 and the matching collection of {function( ),"text"} pairs in the "Ringtone Rules" 307 database that are active. If a perfect match is not found among the active items, the next best match is searched in step 606. Perfect match is the same collection of {function( ), "text"} pairs in the "Ringtone Rules" 307 database as in the "Events Set" 303. The next best match is a collection of at least one {function( ), "text"} pairs, in the "Ringtone Rules" 307 database, that is smaller than the items in the "Events Set" 303. The steps 603 and 606 undertaken for perfect and next best match are illustrated in the example 7 below:

Example 7

Assume Events Set={Day( ),"Tuesday"}+{Year( ), "2013"} and Ringtone Rules database is as follows:

| RINGTONE RULES | ACTIVE? |
| --- | --- |
| {GPS(location),"Home"}+ {Day( ),"Tuesday"} +{"Homework","Dog-Bark"} | Y |
| {GPS(location),"Home"} +{"John Doe","RoosterCall"} | Y |
| {Time(location),"1:00PM"} +{NULL,"Doorbell"} | N |
| {GPS(speed),"70mph"}+{NULL,"PoliceSiren"} | Y |
| {Day( ),"Tuesday"} +{NULL,"Doorbell"} | ... |
| {Day( ),"Tuesday"}+ {Year( ), "2013"} +{GPS(location),"Home"} +{NULL,"TelephoneFX"} | N |

-continued

| RINGTONE RULES | ACTIVE? |
|---|---|
| {Day( ),"Tuesday"}+ {Year( ), "2013"} +{NULL,"DogBark"} | Y |
| {Day( ),"Tuesday"}+ {Year( ), "2012"} +{NULL,"Doorbell"} | Y |

The perfect match is found with {Day( ),"Tuesday"}+{Year( ), c"2013"}+{NULL,"DogBark"} as this is an active item.

As another scenario illustrating the next best match, assume that the Events Set={Day( ),"Tuesday"}+{Year( ), "2013"} and Ringtone Rules database is as follows:

| RINGTONE RULES | ACTIVE? |
|---|---|
| {GPS(location),"Home"}+ {Day( ),"Tuesday"} +{"Homework","DogBark"} | Y |
| {GPS(location),"Home"} +{"John Doe","RoosterCall"} | Y |
| {Time(location),"1:00PM"} +{NULL,"Doorbell"} | N |
| {GPS(speed),"70mph"}+{NULL,"PoliceSiren"} | Y |
| {Day( ),"Tuesday"} +{NULL,"Doorbell"} | ... |
| {Day( ),"Tuesday"}+ {NULL,"TelephoneFX"} | Y |
| {Day( ),"Tuesday"}+ {Year( ), "2013"}+ {GPS(location),"Home"}+{NULL,"DogBark"} | Y |
| {Day( ),"Tuesday"}+ {Year( ), "2012"} +{NULL,"Doorbell"} | Y |

There is no perfect match, but the next best match is found with {Day( ),"Tuesday"}+{NULL,"TelephoneFX"} as this is an active item. Note that {Day( ),"Tuesday"}+{Year( ), "2013"}+{GPS(location),"Home"}+{NULL,"DogBark"} is not any match as it has additional {key,value} pair from the "Events Dictionary" 301 that prevents it from being matched.

As yet another scenario illustrating that no best match is found, assume that the Events Set={Day( ),"Tuesday"}+{Year( ), "2013"} and Ringtone Rules database is as follows:

| RINGTONE RULES | ACTIVE? |
|---|---|
| {GPS(location),"Home"}+ {Day( ),"Tuesday"} +{"Homework","DogBark"} | Y |
| {GPS(location),"Home"} +{"John Doe","RoosterCall"} | Y |
| {Time(location),"1:00PM"} +{NULL,"Doorbell"} | N |
| {GPS(speed),"70mph"}+{NULL,"PoliceSiren"} | Y |
| {Day( ),"Tuesday"} +{NULL,"Doorbell"} | ... |
| {Day( ),"Tuesday"}+ {Year( ), "2013 "} +{GPS(location),"Home"} +{NULL,"DogBark"} | N |
| {Day( ),"Tuesday"}+ {Year( ), "2012"} +{NULL,"Doorbell"} | Y |

{Day( ),"Tuesday"}+{Year( ), "2013"}+{GPS(location), "Home"}+{NULL,"DogBark"} is not any match as it has additional {key,value} pair from the "Events Dictionary" 301 that prevents it from being matched.

In case neither the perfect 603 nor the next best match 606 are found by the "Background Mode Logic Module", it continues to Wait for intercepting any new device events 601.

In case a perfect 603 or the next best match 606 are found, the "Background Mode Logic Module" of the "Control Program" 304 proceeds to step 604 and examines the key of the {key,value} pair that represents the item from "Ringtone Mappings" 305 in the "Ringtone Rules" 307. If the key=NULL, which means no text is associated with the ringtone, the "Background Mode Logic Module" of the "Control Program" 304 simply uses the API of the smartphone operating system to play the respective ringtone.

If, however, as illustrated in step 605, the key of the {key,value} pair that represents the item from "Ringtone Mappings" 305 in the "Ringtone Rules" 307 is not NULL and has a text, the "Background Mode Logic Module" of the "Control Program" 304 compares this text with the values returned from the device event in step 601. This comparison is carried out by using a standard string search API provided by the smartphone operating system. If any of the values from the device event matches the text from in this {key,value} pair, the "Background Mode Logic Module" of the "Control Program" 304 simply uses the API of the smartphone operating system to play the respective ringtone represented by the value part of this {key, value} pair. If the match in step 607 fails, the "Background Mode Logic Module" of the "Control Program" 304 returns to step 601 to watch and intercept new device events.

The steps 604 and 607 are illustrated in the example 8 and example 9 as follows:

Example 8

Assume a match (perfect or next best match) was found in the "Ringtone Rules" 307 as {Day( ),"Tuesday"}+{Year( ), "2013"} and Ringtone Rules database is as follows:

| RINGTONE RULES | ACTIVE? |
|---|---|
| {GPS(location),"Home"}+ {Day( ),"Tuesday"} +{"Homework","DogBark"} | Y |
| {GPS(location),"Home"} +{"John Doe","RoosterCall"} | Y |
| {Time(location),"1:00PM"} +{NULL,"Doorbell"} | N |
| {GPS(speed),"70mph"}+{NULL,"PoliceSiren"} | Y |
| {Day( ),"Tuesday"} +{NULL,"Doorbell"} | ... |
| {Day( ),"Tuesday"}+ {Year( ), "2013"} +{GPS(location),"Home"}+{NULL,"TelephoneFX"} | Y |
| {Day( ),"Tuesday"}+ {Year( ), "2013"} +{NULL,"DogBark"} | Y |
| {Day( ),"Tuesday"}+ {Year( ), "2012"} +{NULL,"Doorbell"} | Y |

The associated {key,value} pair coming from the "Ringtone Mappings" 305 is {NULL,"DogBark"}, in this case, values returned from the device event are not evaluated and a ringtone identified by the name "DogBark" is played.

Example 9

Assume a match (perfect or next best match) was found in the "Ringtone Rules" 307 as {Day( ),"Tuesday"}+{Year( ), "2013"} and Ringtone Rules database is as follows:

| RINGTONE RULES | ACTIVE? |
|---|---|
| {GPS(location),"Home"}+ {Day( ),"Tuesday"} +{"Homework","DogBark"} | Y |
| {GPS(location),"Home"} +{"John Doe","RoosterCall"} | Y |
| {Time(location),"1:00PM"} +{NULL,"Doorbell"} | N |
| {GPS(speed),"70mph"}+{NULL,"PoliceSiren"} | Y |

-continued

| RINGTONE RULES | ACTIVE? |
|---|---|
| {Day( ),"Tuesday"} +{NULL,"Doorbell"} | ... |
| {Day( ),"Tuesday"}+ {Year( ), "2013"} +{GPS(location),"Home"}+{NULL,"TelephoneFX"} | Y |
| {Day( ),"Tuesday"}+ {Year( ), "2013"} +{"Homework","CatMeow"} | Y |
| {Day( ),"Tuesday"}+ {Year( ), "2012"} +{NULL,"Doorbell"} | Y |

The associated {key,value} pair coming from the "Ringtone Mappings" 305 is {"Homework","CatMeow"}, in this case, since the key is not NULL, values returned from the device event are evaluated in step 607 and a ringtone identified by the name "CatMeow" is played in step 605 if the contents of the value from the device event have a string that matches "Homework". In case there Is not match of the key and the device values, no ringtone is played and the "Background Mode Logic Module" of the "Control Program" 304 goes back to step 601 to listen and intercept new device events.

A real life example of the above is a student receiving a text message from the teacher that "Your Homework is past due". Assuming the events in example 9, the student's smartphone will play the "CatMeow" ringtone, reminding the student that a rule related to "Homework" has fired a special ringtone that deserves attention.

The examples and figures demonstrate the various components need to successfully implement an "Intelligent Ringtone and Alarm Management System". The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

INDUSTRIAL APPLICABILITY

As we can see the current invention can be used in many different areas that can benefit daily of us smartphone. One application that the current invention provides a means to automatically switch on the ringtone implemented as a flash if the Ambient Light Sensor on the smartphone senses dark conditions. Another application can be to use the "Ringtones Rules", 307 to warn the driver carrying a smartphone, with a specific ringtone when they receive a text, phone call or email and the GPS senses that the driver is speeding above a certain speed. This can warn the driver that it is not safe to attend to the smartphone. Alternatively, the present invention can be used to alert a person with a smartphone when they receive a text message with the words "urgent" from their kids or parents.

As we can see, the flexibility of the present invention, lends itself to many users, left only to human imagination. The key is to provide a system and method for the smartphones to intelligently use the device or user events, location, sensor data of any kind on the smartphone and the ability to combine the decisions based on content of the events, messages, and alerts to alter the ringtone behavior.

What is claimed is:

1. A method implemented in a smartphone or a smart watch, the method comprising:
   Storing, in a storage of the smartphone or the smart watch, an event dictionary, a ringtone mappings, a events set, a set of device events and ringtone rules;
   the event dictionary comprises at least one or more items in a key-value pair structure;
   the ringtone rules comprises at least one or more rule items in a rule pair data structure;
   the ringtone mapping comprises at least one or more mapping items with a mapping key-value structure;
   the set of device events including an incoming call, caller-ID, calendar event, reminder, email or text message; wherein the device event comprises at least one received text from other devices;
   Evaluating, by the smartphone or the smart watch, each of the at least one or more items stored in the events dictionary upon interception of a device event from the set of device events; wherein the evaluating result is True if the value in the set of device events is the same as the value in the key-value pair; Creating a customized events set from all of the one or more items that resulted in True in the evaluation and removing items that do not evaluate to true;
   Searching for an exact match by comparing the key-value pair structure of the items in the customized events set with rule pair of the one or more rule items in the ringtone rules marked as active;
   Selecting a ringtone associated with the value in a mapping key-value pair of a corresponding ringtone mapping pair for playing when an exact match is found, and the key for in the mapping key-value pair of the corresponding ringtone mapping pair is NULL;
   Searching for the maximum number of common keys between the rule items having a smaller or equal number of keys from the items in ringtone rules and the customized event set for the rule items and the items having a same value;
   Selecting a next best match ringtone for playing when the next best match is found, and the key in the mapping key-value pair of a corresponding ringtone mapping pair is NULL; wherein the best match ringtone is associated with the value in a mapping key-value pair of the next best match; and
   Scanning the at least one received text from the set of device events when the key for the ringtone mapping pair in either the exact match or the next best match is not NULL and selecting an associated ringtone specified in the value of the ringtone mapping pair with the key containing any portion of the received text from the device event for playing.

* * * * *